United States Patent
Wagter et al.

[11] Patent Number: 5,915,640
[45] Date of Patent: Jun. 29, 1999

[54] REEL FOR STORING SURPLUS CABLE

[75] Inventors: Hendrik Sjirk Wagter, Mourik; Ralph Stuyver, Utrecht; Joop Hakker, Soest, all of Netherlands

[73] Assignee: InnoEssentials International B.V., A/D Ijssel, Netherlands

[21] Appl. No.: 09/133,180

[22] Filed: Aug. 12, 1998

Related U.S. Application Data

[63] Continuation of application No. PCT/NL97/00052, Feb. 11, 1997.

[30] Foreign Application Priority Data

Feb. 14, 1996 [NL] Netherlands ............................ 1002347

[51] Int. Cl.$^6$ .................................................... B65H 75/38
[52] U.S. Cl. ........................................................ 242/388.1
[58] Field of Search ................................ 242/388, 388.1, 242/388.6; 40/124.06, 124.4, 642.01

[56] References Cited

U.S. PATENT DOCUMENTS

| | | |
|---|---|---|
| 1,692,517 | 11/1928 | Replogle .............................. 242/388.1 |
| 1,983,565 | 12/1934 | Replogle . |
| 2,319,731 | 5/1943 | Garrett . |
| 2,429,675 | 10/1947 | Eypper . |
| 2,438,805 | 3/1948 | Hoyle . |
| 2,449,464 | 9/1948 | Eypper . |
| 2,656,991 | 10/1953 | Neely . |
| 2,865,071 | 12/1958 | Clemens .............................. 242/388.1 |
| 2,952,420 | 9/1960 | Hoorn . |
| 2,991,523 | 7/1961 | Conte . |
| 3,078,058 | 2/1963 | Roe . |
| 3,084,886 | 4/1963 | Bastow . |
| 3,208,121 | 9/1965 | Price . |
| 3,782,654 | 1/1974 | Kasa .................................... 242/388.1 |
| 3,809,331 | 5/1974 | Gaul . |
| 3,874,608 | 4/1975 | Quenot . |
| 4,150,798 | 4/1979 | Aragon . |
| 4,172,567 | 10/1979 | Post . |
| 4,322,045 | 3/1982 | Tellier . |
| 4,390,142 | 6/1983 | Cheng . |
| 4,726,536 | 2/1988 | Lerner et al. . |
| 4,802,638 | 2/1989 | Burger et al. ........................ 242/388.1 |
| 5,201,495 | 4/1993 | Crates et al. . |
| 5,779,175 | 7/1998 | Shirahase ............................ 242/388.1 |

FOREIGN PATENT DOCUMENTS

| | | |
|---|---|---|
| 0 420 721 A1 | 3/1991 | European Pat. Off. . |
| 931415 | 2/1955 | Germany . |
| 6-171836 | 6/1994 | Japan .................................. 242/388.1 |
| 69831 | 2/1937 | Netherlands . |
| 6405094 | 11/1964 | Netherlands . |
| 166920 | 1/1934 | Switzerland . |
| 994143 | 6/1965 | United Kingdom . |
| WO 90/01821 | 2/1990 | WIPO . |

Primary Examiner—John P. Darling
Attorney, Agent, or Firm—Arthur A. Gardner & Associates, P.C.

[57] ABSTRACT

A reel for winding up and unwinding surplus cable, comprising a first housing part and a second housing part which are connected together as to be able to rotate with respect to one another about a common axis and together enclose a chamber for receiving the cable. The reel includes a central member present in the chamber with each housing part having a free rim which extends in a plane perpendicular to the axis, with the housing parts each comprising a slot which extends as far as the free rim. During the winding operation, a cable part which extends through the two slots into the chamber is pulled further into the chamber by rotating the housing parts with respect to one another and is thereby wound around the central member. The housing parts are connected to one another by means of a connection which is releasable via an operating member.

7 Claims, 2 Drawing Sheets

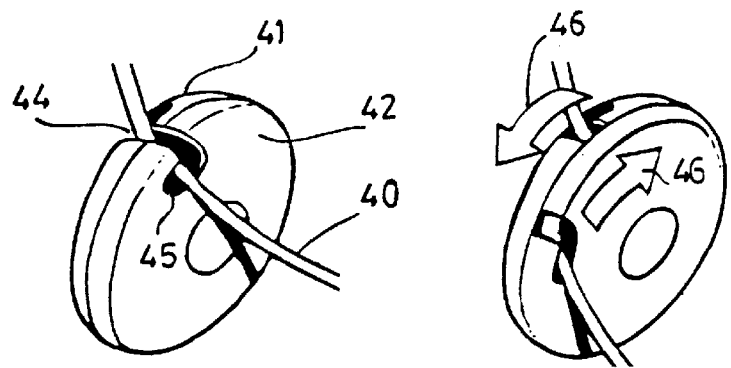
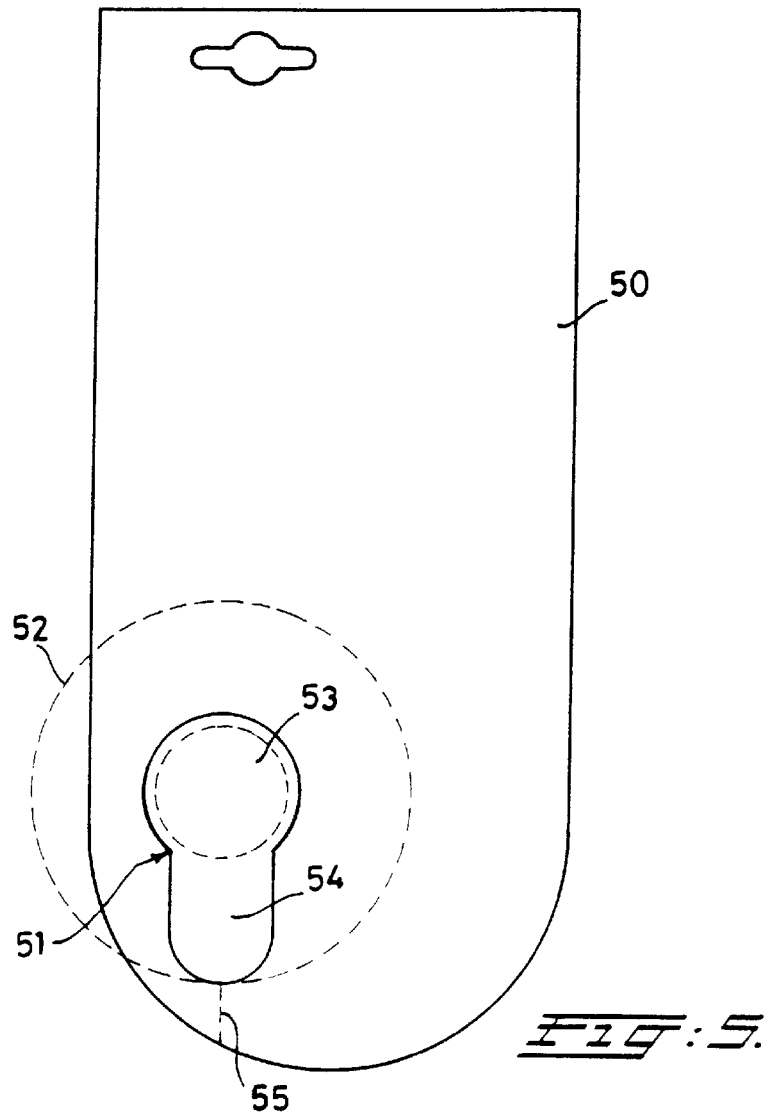

5,915,640

REEL FOR STORING SURPLUS CABLE

This application is a continuation of international application number PCT NL 97/00052 filed Feb. 11, 1997.

TECHNICAL FIELD

BACKGROUNG OF THE INVENTION

The invention relates to a reel for winding up and unwinding a free part of a wire.

A reel of this kind is known from U.S. Pat. No. 4,390,142. In this known reel, a housing enclosing a hollow chamber is provided with a disc which can rotate therein and has a slot for receiving and entraining a wire. On its periphery, the housing is provided with a slot through which a wire loop can be pushed, which wire loop should then be placed in the slot in the rotatable disc. By rotating the disc with respect to the housing, it being possible to operate the disc from outside for this purpose, the wire is thus pulled into the housing, in which it is wound up around a central member.

A drawback here is that a reel of this kind comprises many complex components, is difficult to assemble and dismantle and is relatively expensive to produce. If a wound-up wire part, for example a thick, stiff computer lead, becomes stuck in a reel of this kind, such that the rotatable disc can no longer be rotated with respect to the housing, this wire part can only be released by dismantling the reel. In this case, this dismantling is extremely laborious and time-consuming.

The object of the present invention is to provide a reel in which these drawbacks are eliminated.

SUMMARY OF THE INVENTION

This object is achieved in accordance with the invention by means of a reel comprising a first housing part and a second housing part, which are connected so as to be able to rotate with respect to one another about a common axis and together enclose a chamber for receiving the wire, a central member being present in the chamber, each housing part having a free rim which extends in a plane perpendicular to the axis common, and each housing part comprising a slot which extends as far as the free rim. During the winding operation a wire part which extends through the two slots into the chamber is pulled further into the chamber by rotating the housing parts with respect to one another and wound around the central member. The housing parts are connected to one another by means of a connection which is releasable via an operating member. In this way, it is possible to release the housing parts from one another in a simple manner, as a result of which the already wound-up wire part can be slid off the central member. This is advantageous both in the case of the example mentioned of a wire part that became stucked and is also the quickest way of unwinding again a long portion of wound-up wire. The reel according to the invention no longer requires a separately rotatable disc which, moreover, has to be accommodated inside the housing and has to be operable from the outside. As a result, the reel according to the invention can be produced very simply and inexpensively.

In particular, the first housing part is provided at the location of the axis with a socket including an inwardly projecting stop rim, and the second housing part is provided with one or more resilient lips with snap-in rims which engage behind the stop rim in the first housing part so as to form the connection between the housing parts, the operating member being an element which is displaceable in the socket of the first housing part and can interact with the resilient lips in order, if desired, to release the engagement of the said lips with the stop rim in the first housing part. This provides, therefore, a connection between the housing parts which can be released simply and rapidly, specifically by depressing the operating member, and also permits simple and rapid assembly of the reel. Advantageously, a reel of this kind comprises few components which can be produced from the same material, for example plastic.

In addition, the invention relates to a method of packaging a reel of this kind, the first and second housing parts being clamped around an information card, the central member extending through a cutout made in the information card. The packaging in this case merely comprises an information card which is simple and inexpensive to produce. Due to the fact that the reel can be assembled rapidly and simply, the reel can likewise be clamped rapidly and simply around the information card, thus providing a very inexpensive and effective packaging, which is possible due to the special design of the reel according to the invention.

BRIEF DESCRIPTION OF THE DRAWING FIGURES

The invention will be explained in more detail with reference to the drawing, in which:

FIGS. 3 and 4 show the winding-up operation of the reel of FIG. 1 in two steps; and FIG. 5 shows an information card with, in broken lines, a reel clamped around it.

DETAILED DESCRIPTION OF THE PREFERRED EMBODIMENT

Figure 1:
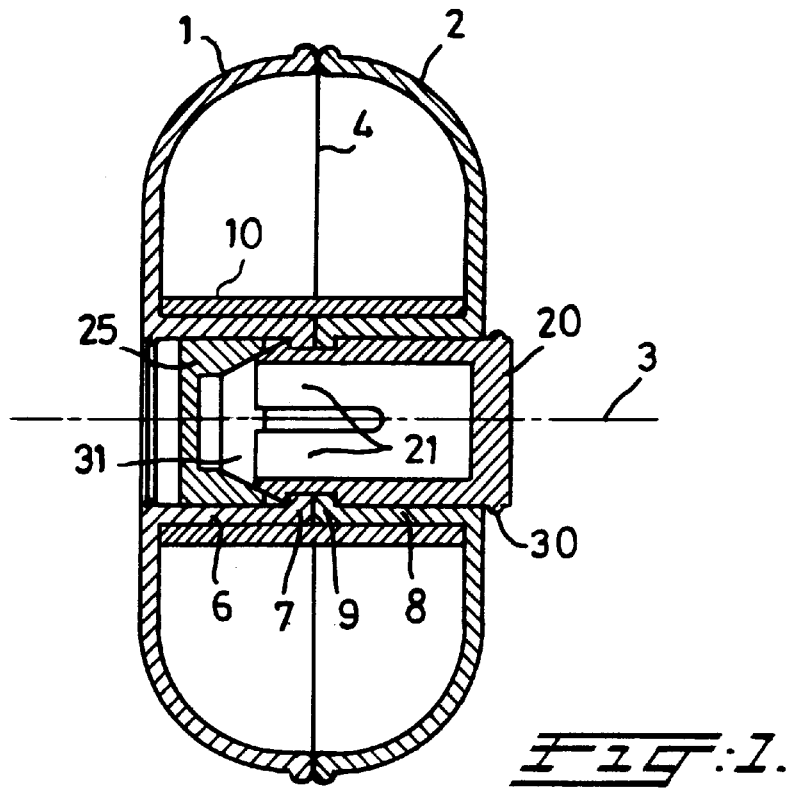
FIG. 1 is a cross-sectional view of a preferred embodiment of a reel according to the invention.
Figure 2:
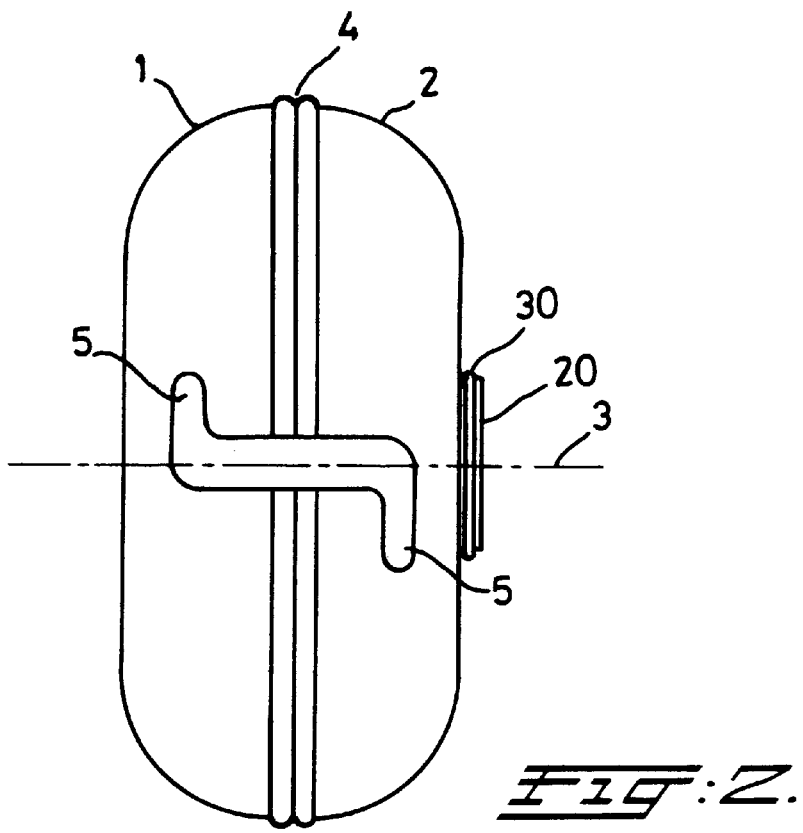
FIG. 2 is a front view of the reel in FIG. 1.

The reel shown in FIGS. 1 and 2 has a housing comprising a first housing part and a second housing part 1, 2 which can rotate with respect to one another about an axis 3. In this case, the housing may have any desired form, for example the form of a box or a sphere. The housing parts 1, 2 each have a free rim 4 which projects in a plane perpendicular to the axis 3. In addition, the housing parts 1, 2 are each provided in the center with a socket 6, 8, with an inwardly projecting stop rim 7, 9 in each socket 6, 8. The free rims 4 of the housing parts 1, 2 substantially adjoin one another and thus enclose a chamber with the two sockets 6, 8 in the center. A hollow cylinder 10 is arranged around the sockets 6, 8. In particular, this hollow cylinder 10 can rotate freely with respect to the housing parts 1, 2 and the sockets 6, 8 which are connected thereto. Each housing part 1, 2 is provided with a slot 5 which extends as far as the free rim 4. The connection between the housing parts 1, 2 is in this case formed by a connection element 20 accommodated in the socket 8. The connection element 20 is in this case of bush-like design and at its end comprises four resilient lips 21. These resilient lips 21 are formed in a simple manner by arranging slots in the all of the bush-shaped connection element 20, which slots extend in the longitudinal direction as far as the end. Instead of four, it is also possible to use any other number of desired lips. The resilient lips 21 have snap-in rims which engage behind the stop rim 7. Due to the fact that the connection element 20 moreover bears with a rim against the stop rim 9, a connection is thus formed between the housing parts 1, 2. Advantageously, this connection can be released in a simple manner via an operating member 25. In this case, the operating member 25 is formed by a cap-shaped element which is accommodated displaceably in the socket 6. The operating member 25 is provided with a recess with a bevelled edge. This bevelled edge can engage on the resilient lips 21, which are advantageously likewise provided with a bevel at the location of the snap-in rims. By pressing the operating member 25 in the direction of the connection element 20, the resilient lips 21 are pressed inwards in the radial direction due to an interaction between the sloping edges. In this way, the snap-in rims of the resilient lips 21 are disengaged from the stop rim 7. The housing parts 1, 2 can then be removed from one another.

The operation of the reel will now be described briefly with reference to FIGS. 3 and 4. To start with, the housing parts 41, 42 should be rotated with respect to one another such that the slots 44, 45 are aligned with one another. Part of a wire which is to be wound up, for example a lead of a telephone, computer or lamp, can then be placed in the slots 44, 45. By then rotating the housing parts 41, 42 in opposite directions with respect to one another, as indicated by the arrows 46, the wire is wound up around a central member situated in the housing. The housing parts 41, 42 should be rotated with respect to one another just until the wire has been shortened to the desired length. The wire can be unwound again by rotating the housing parts 41, 42 in the opposite direction with respect to one another or by breaking the connection between the housing parts, as a result of which the housing parts 41, 42 can be removed from one another and the wound-up wire part can easily be slid off the central member.

As can be seen in particular in FIG. 2, the slots 5 comprise a part which is at an angle of 90° to the initial direction of the slots 5. As a result, the wire is held better in the separate slots 5 while winding up. Naturally, the slot may also have any other desired form.

Advantageously, the central member in the reel shown in FIG. 1 is formed by the freely rotatable hollow cylinder 10. As a result, the entire reel can easily be slid over the wire after part of the wire has already been wound up. During the sliding, the hollow cylinder 10 will rotate with respect to the housing parts 1, 2, as a result of which a piece of wire is released on one side of the wound-up wire part, while an equally large piece of wire is wound up on the other end. Due to this possibility of sliding, it is no longer necessary to place the reel precisely at the center of the wire part which is to be wound up, and following the winding operation the reel can be visually concealed in a simple manner, for example by sliding it behind a cupboard. Moreover, the hollow cylinder 10 strengthens the connection of the housing parts 1, 2. The hollow cylinder 10 can also be omitted, in which case the wire is wound directly around the sockets 6, 8. It is also possible to make the sockets 6, 8 much smaller, as a result of which they no longer bear against one another in the center. In that case, however, it is essential that a cylindrical part be used which can be slid over the sockets.

In another variant (not shown), the resilient lips form part of one of the sockets. As a result, in its simplest form the reel may comprise only three components, namely two housing parts and an operating member. However, the embodiment shown with the separate connection element 20 has the advantage that the housing parts 1, 2 can be identical to one another. This is particularly advantageous for manufacturing the separate components of the reel. Another possibility for an easily releasable connection between the housing parts may be formed by using a so-called bayonet closure (not shown). The bayonet closure may then, for example, be implemented between a connection element which is connected to the second housing part and the operating member which is connected to the first housing part, or between a connection element which is connected to the second housing part and the first housing part. In the case of this latter variant, the connection element should be able to rotate freely in the second housing part and thus also forms the operating member.

An inwardly projecting snap-in rim 31 is arranged in the socket 6. As a result, the operating member 25 can no longer fall out of the housing part 1. Due to the fact that the operating member 25 is accommodated countersunk in the socket 6, and part of the connection element 20 projects outside the housing part 2, this projecting part of the connection element 20 can be accommodated in a clamping manner in the socket of a second reel of this design. To this end, in particular a snap-in rim 30 is arranged on the projecting part of the connection element 20, which rim comes to rest behind the snap-in rim 31 after coupling two reels.

FIG. 5 shows an information card 50, in which a keyhole-shaped cutout 51 is situated. The cylindrical part 53 of the lock-shaped cutout 51 is intended to receive the central member of a reel 52 according to the invention, which is indicated only by dashed lines. As a result, it is possible to clamp the information card 50 between the first and second housing parts of the reel 52. The slot-shaped part 54 of the lock-shaped cutout 51 extends in particular in the direction of an edge of the information card 50 as far as beyond the free rim of the housing parts of the reel 52, which rim bears against both sides of the card. As a result, in order to remove the packaging 50 it is advantageously sufficient to break open the information card 50 along the line 55, after which the information card 50 can be slid out between the two housing parts.

A reel for winding up and unwinding the free part of a wire is thus provided which comprises very few components, which can be produced simply and inexpensively, is simple to operate and, moreover, can be packaged in a very advantageous manner.

What is claimed is:

1. A reel for winding up and unwinding a free part of a wire, comprising a first housing part and a second housing part, which are connected so as to be able to rotate with respect to one another about a common axis and together enclose a chamber for receiving the wire, further comprising a central member present in the chamber, each housing part having a free rim which extends in a plane perpendicular to the axis, and each housing part comprising a slot which extends as far as the free rim, in which during the winding operation a wire part which extends through the two slots into the chamber is pulled further into the chamber by rotating the housing parts with respect to one another and wound around the central member, and in which the housing parts are connected to one another by means of a connection which is releasable via an operating member.

2. A reel according to claim 1 wherein the first housing part is provided with a socket adjacent the axis and including an inwardly projecting stop rim, and the second housing part is provided with one or more resilient lips with snap-in rims which engage behind the stop rim in the first housing part so as to form the connection between the housing parts, the operating member being an element which is displaceable in the socket of the first housing part and can interact with the resilient lips in order, if desired, to release the engagement of the lips with the stop rim in the first housing part.

3. A reel according to claim 2 wherein the second housing part is provided with a socket adjacent the axis and including an inwardly projecting stop rim, and a separate connection element is incorporated in the socket and which bears the resilient lips.

4. A reel according to claim 3 wherein the central member is a hollow cylinder which can rotate freely over the sockets which are accommodated in the housing parts.

5. A reel according to claim 3 wherein for the purpose of coupling a plurality of reels to one another, part of the connection element projects beyond the second housing part and the operating member is accommodated countersunk in the socket of the first housing part, so that the projecting part of the connection element can be accommodated in a clamping manner in the socket of the first housing part of a second reel.

6. A reel according to claim 1 wherein the first and second housing parts are identical.

7. A reel according to claim 1 wherein the first and second housing parts are clamped around an information card, the central member extending through a cutout made in the information card.

* * * * *